US008509476B2

(12) United States Patent
Amin et al.

(10) Patent No.: US 8,509,476 B2
(45) Date of Patent: Aug. 13, 2013

(54) AUTOMATED SYSTEM AND METHOD FOR OPTICAL CLOUD SHADOW DETECTION OVER WATER

(75) Inventors: Ruhul Amin, New Orleans, LA (US); Richard W. Gould, Pearl River, LA (US); Weilin Hou, Slidell, LA (US); Robert Arnone, Carriere, MS (US); Zhongpong Lee, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 141 days.

(21) Appl. No.: 13/231,290

(22) Filed: Sep. 13, 2011

(65) Prior Publication Data

US 2013/0064420 A1    Mar. 14, 2013

(51) Int. Cl.
*G06K 9/00* (2006.01)

(52) U.S. Cl.
USPC ........................................................ 382/100

(58) Field of Classification Search
USPC ............................................................ 702/3
See application file for complete search history.

(56) References Cited

U.S. PATENT DOCUMENTS

| 5,612,901 | A | * | 3/1997 | Gallegos et al. ................... 702/3 |
| 7,184,890 | B2 | | 2/2007 | Boright et al. |
| 2005/0111692 | A1 | * | 5/2005 | Boright et al. ................. 382/100 |
| 2005/0114027 | A1 | | 5/2005 | Boright et al. |
| 2005/0175253 | A1 | | 8/2005 | Li et al. |
| 2008/0063238 | A1 | * | 3/2008 | Wiedemann et al. ......... 382/103 |
| 2009/0087093 | A1 | * | 4/2009 | Eaton et al. ................... 382/173 |

OTHER PUBLICATIONS

R. Amin, A. Gilerson, J. Zhou, B. Gross, F. Moshary and S. Ahmed, "Impacts of atmospheric corrections on algal bloom detection techniques," 89th AMS Annual Meeting, Phoenix, Arizona, Jan. 11-15, 2008.
R. Amin, J. Zhou, A. Gilerson, B. Gross, F. Moshary and S. Ahmed, "Novel optical techniques for detecting and classifying toxic dinoflagellate *Karenia brevis* blooms using satellite imagery," Opt. Exp. 17, 9126-9144 (2009).
H. R. Gordon, and M. Wang, "Retrieval of water-leaving radiance and aerosol optical thickness over the ocean with SeaWiFS: a preliminary algorithm," Appl. Opt. 33, 443-452 (1994).
Moving Shadow Detection Using a Physics-based Approach, Sohail Nadimi and Bir Bhanu, Center for Research in Intelligent Systems, University of California, Riverside, California, 2002.
GDA Corp., Seminar, Operational Information Extraction from P6-AWiFS Imagery "ResourceSatResourceSatReal Product Innovations" Real Seminar Nov. 27, 2007.
Automated Detection and Removal of Clouds and Their Shadows from Landsat TM Images, Bin Wang, et al, Feb. 1999.
De-shadowing of satellite/airborne imagery, R. Richter and A. Muller, DLR, German Aerospace Center, Remote Sensing. International Journal of Remote Sensing vol. 26, No. 15, Aug. 10, 2005, 3137-3148.

(Continued)

*Primary Examiner* — Claire X Wang
(74) *Attorney, Agent, or Firm* — Amy L. Ressing; Kathleen Chapman (57) ABSTRACT

System and method for detecting cloud shadows over water from ocean color imagery received from remote sensors.

21 Claims, 8 Drawing Sheets

(56) References Cited

OTHER PUBLICATIONS

Change Detection Using Ikonos Imagery Donna Haverkamp and Rick Poulsen, Department of Research and Product Development, Space Imaging LLC, http://geoeye.com/CorpSite/assets/docs/technical-papers/2003/D_HaverkampDonna_RickPoulsen_2003.pdf, 2003.

Cloud Masking Scheme Based on Spectral, Morphological and Physical Features Luis Gómez-Chova, et al Proc. of the 3rd ESA CHRIS/Proba Workshop, Mar. 21-23, ESRIN, Frascati, Italy, (ESA SP-593, Jun. 2005).

Development of Cloud and Shadow Free Compositing Technique With MODIS QKM , Wataru Takeuchi, Yoshifumi Yasuoka ASPRS 2006 Annual Conference, Reno, Nevada May 1-5, 2006.

Generating cloudmasks in spatial high-resolution observations of clouds using texture and radiance information M. Schroder, et al, International Journal of Remote Sensing, 2002, vol. 23, No. 20, 4247-4261.

Min Li, Soo Chin Liew and Leong Keong Kwoh (2004), Automated Production of Cloud-free and Cloud Shadow-free Image Mosaics from Cloudy Satellite Imagery, Proc. XXth Congress of the International Society for Photogrammetry and Remote Sensing, Jul. 15-23, 2004.

Cloud Clearing over the Ocean in the Processing of Data from the Along-Track Scanning Radiometer (ATSR), Zavody, et al, May 2000, American Meterological Society Rutherford Appleton Laboratory, Chilton Didcot, Oxfordshire, United Kingdom, David T. Llewellyn-Jones, Department of Physics and Astronomy, Leicester University, Leicester, United Kingdom.

An Algorithm for DE-Shadowing Spectral Imagery, Steven M. Adler-Golden, et al, Conference Paper, Air Force Research Lab Hanscom AFB MA Space Vehicles Directorate, Jul. 2002.

Remote Sensing and Cast Shadows in Mountainous Terrain, Philip T. Giles, Photogrammetric Engineering & Remote Sensing, Jul. 2001.

Shadow Analysis in High-Resolution Satellite Imagery of Urban Areas Paul M. Dare, Photogrammetric Engineering & Remote Sensing,Feb. 2005.

A knowledge-based Approach for Reducing Cloud and Shadow, Mingjun Song, et al, slides, (LERIS/University of Connecticut), May 2007.

Correction of satellite imagery over mountainous terrain, Rudolf Richter, 4004 Applied Optics, vol. 37, No. 18, Jun. 20, 1998.

Cumulus Cloud Base Height Estimation from High Spatial Resolution Landsat Data: A Hough Transform Approach Todd Berendes, et al, IEEE Transactions on Geoscience and Remote Sensing, vol. 30, No. 3, May 1992.

Discriminating clear sky from clouds with MODIS, Steven A. Ackerman, et al, Journal of Geophysical Research, vol. 103, No. D24, p. 32,141-32,157, Dec. 27, 1998.

Diurnal evolution of cloud base heights in convective cloud fields from MSG/SEVIRI data, R. Meerkotter and L. Bugliaro, Atmos. Chem. Phys., 9, 1767-1778, 2009.

Land surface monitoring with Japanese geostationary satellite Kei Oyoshi, Wataru Takeuchi, Masayuki Tamura, Kyoto University,The University of Tokyo, Poster, 2007.

A Geometry-Based Approach to Identifying Cloud Shadows in the VIIRS Cloud Mask Algorithm for NPOESS Keith D. Hutchison, et al, Northrop Grumman Space Technology, Redondo Beach, CA;University of Maryland, Feb. 1, 2002.

Spectral anomaly detection in deep shadows Andrey V. Kanaev1 and Jeremy Murray-Krezan, Global Strategies Group N.A. Inc., 2200 Defense Hwy, Suite 405, Crofton, MD 21114, Naval Research Laboratory, 4555 Overlook Avenue SW, Washington, DC 20375, Appl Opt. Mar. 20, 2010;49(9):1614-22. doi: 10.1364/AO.49.001614.

Cloud detection in Landsat imagery of ice sheets using shadow matching technique and automatic normalized difference snow index threshold value decision, Hyeungu Choi, Remote Sensing of Environment 91 (2004) 237-242.

Discriminating Clear-Sky From Cloud With MODIS Algorithm Theoretical Basis Document (MOD35), MODIS Cloud Mask Team Steve Ackerman, et al, Cooperative Institute for Meteorological Satellite Studies, University of Wisconsin—Madison, Version 6.1, Oct. 2010.

Algorithm Technical Background Document, Atmospheric Correction Algorithm: Spectral Reflectances (MOD09), Version 4.0, Apr. 1999, NASA contract NAS5-96062, E. F. Vermote and A. Vermeulen University of Maryland, Dept of Geography.

Discriminating Clear-Sky From Cloud With MODIS Algorithm Theoretical Basis Document.(MOD35), MODIS Cloud Mask Team, Steve Ackerman, et al, Version 4.0 Oct. 2002.

Level 2 Cloud Detection and Classification Jet Propulsion Laboratory California Institute of Technology, Dec. 1, 1999, (MISR) Multi-angle Imaging Spectro- Radiometer Earth Observing System Algorithm Theoretical Basis, David Diner, et al.

Cloud Cover Detection Algorithm for EO-1 Hyperion Imagery, Michael Griffin and Hsiao-hua Burke, MIT Lincoln Laboratory, Dan Mandl and Jerry Miller, NASA GSFC, EO-1 SVT Meeting, Nov. 21, 2002.

Cloud and Cloud Shadow Assessment—CASA Software , "Automated Feature Extraction in Medium and High Resolution VNIR Imagery", GDA Corp., 2010.

A Procedure for the Detection and Removal of Cloud Shadow from AVHRR Data over Land James J. Simpson, IEEE Transactions on Geoscience and Remote Sensing, vol. 36, No. 3, May 1998.

Cloud Shadow Removal From Aerial Photographs, Joseph Shou-Pyng Shu, et al, Pattern Recognition, vol. 23, No. 6, pp. 647-656, 1990.

Developing clear-sky, cloud and cloud shadow mask for producing clear-sky composites at 250-meter spatial resolution for the seven MODIS land bands over Canada and North America, Yi Luo, Remote Sensing of Environment 112 (2008) 4167-4185.

Atmospheric Correction of IKONOS with Cloud and Shadow Image Features,C.W. Chang, et al, Authorized licensed use limited to: NRL. Downloaded on Jan. 12, 2010 at 16:06 from IEEE Xplore.

AWiFS Imagery: Processing & Automated Feature Extraction Dmitry Varlyguin1, et al, Seminar, 2007, GDA Corp.

An automated cloud detection method for daily NOAA-14 AVHRR data for Texas, USA, P.Y. Chen, et al, Int. J. Remote Sensing, 2002, vol, 23, No. 15, 2939-2950.

Detecting Clouds and Cloud Shadows in Multispectral Satellite Images for Tropical Areas, Anthony T. S. Ho, School of Electrical and Electronic Engineering, IPA97, Jul. 15-17, 1997, Conference Publication No. 443 0 IEE, 1997.

Cloud Shadow Detection Under Arbitrary Viewing and Illumination Conditions James J. Simpson, IEEE Transactions on Geoscience and Remote Sensing, vol. 38, No. 2, Mar. 2000.

Comparison of spectral direct and diffuse solar irradiance measurements and calculations for cloud-free conditions Eli J. Mlawer, et al, 2000, ARM Science Team Meeting Proceedings, San-AntonioTexas.

Cloud-Free Satellite Image Mosaics with Regression Trees and Histogram Matching E.H. Helmer, et al, Photogrammetric Engineering & Remote Sensing, Sep. 2005.

Reducing Emissions from Deforestation and Forest Degradation (REDD) Pilot Project Cameroon, Manuela Hirschmugl, et al Institute of Digital Image Processing, 2008.

Development of a cloud, snow and cloud shadow mask for Vegetation imagery Gil Lissens, et al, Medeley, 2000.

A Fractal Dimensional Analysis on the Cloud Shape Parameters of Cumulus over Land, Kazuo Gotoh, et al, Oct. 1998, Goth and Fuji.

Development of Cloud, Snow, and Shadow Masking Algorithms for Vegetation Imagery, G. Lissens, et al, 2000 IEEE.

Creating Cloud-Free Landsat ETM+ Data Sets in Tropical Landscapes: Cloud and Cloud-Shadow Removal Sebastián Martinuzzi, et al, United States Department of Agriculture Forest Service International Institute of Tropical Forestry General Technical Report IITF-GTR-32 Feb. 2007.

Use of Markov Random Fields for automatic cloud/shadow detection on high resolution optical images Sylvie Le Hégarat-Mascle, et al, ISPRS Journal of Photogrammetry and Remote Sensing 64 (2009) 351 366.

SPARC: New Cloud, Snow, and Cloud Shadow Detection Scheme for Historical 1-km AVHHR Data over Canada Konstantin V. Khlopenkov, et al, Journal of Atmospheric and Oceanic Technology vol. 24, Feb. 2006.

Water and bottom properties of a coastal environment derived from Hyperion data measured from the EO-1 spacecraft platform Zhong Ping Lee, et al Journal of Applied Remote Sensing, vol. 1, 011502 (Dec. 26, 2007).

High-Spatial-Resolution Surface and Cloud-Type Classification from MODIS Multispectral Band Measurements, Journal of Applied Meteorology, vol. 42, Jun Li, et al, Dec. 21, 2001.

Cloud Detection for Meris Multispectral Images Luis Gomez-Chova, et al, (A) ATSR Workshop, Sep. 26-30, 2005.

A Pragmatic Solution for Cloud Detection and Removal in Meris L1B Data Franck Ranera, et al, Sep. 2005.

Satellite-sensor calibration verification with the cloud-shadow method Phillip N. Reinersman, et al, Aug. 20, 1998, vol. 37, No. 24, Applied Optics.

* cited by examiner

AUTOMATED SYSTEM AND METHOD FOR OPTICAL CLOUD SHADOW DETECTION OVER WATER

CROSS-REFERENCE TO RELATED APPLICATIONS

Not applicable.

BACKGROUND

Optical satellite sensors can provide a great deal of information for various global applications. However, cloud cover can cause a serious problem for these sensors, especially over humid tropical regions. Throughout the year about two thirds of the Earth's surface is covered by clouds. A problem for an optical sensor is that clouds not only conceal the ground, they also cast shadows and these shadows also occur in the observed images along with the clouds. Unlike airborne imaging where shadows can be minimized by flying at optically advantageous times, low Earth orbit satellite-based sensors are limited to acquiring images at fixed times of the day. If the solar elevation is low at the time, then the presence of shadow is increased. Cloud shadows can either reduce or eliminate useful information in an image. Reduction of information could potentially lead to the corruption of biophysical parameters derived from pixels values. Cloud shadow can produce errors of 30-40% in the observed reflectance from the affected pixels. Since ocean color products are retrieved based on the assumption that the remote sensing reflectances are accurate, a small inaccuracy in the reflectance can lead to significant errors in the retrieved products. Particularly, since most of the product retrieval algorithms are band ratio algorithms, a small disproportionate alteration in the spectral reflectance amplitude can changes the band ratios considerably, hence the retrieved products can be affected. If cloud shadows are not removed appropriately, shadow contamination can become a source of substantial defects in the clear-sky products and may introduce systematic biases in long-term data records.

Cloud shadow detection in ocean color scene can be important and beneficial. For example, the cloud shadowed pixel (pixel illuminated by only skylight photons since direct photons are removed by the cloud) in combination with the neighboring sunlit pixel (pixel illuminated by both direct solar and skylight photons) of similar optical properties can be used to remove atmospheric effects from these scenes. The neighboring sunlit pixels then can be used as known reflectance targets for validation of the sensor calibration and atmospheric correction. Cloud shadow is important for many other reasons as well. For example, cloud shadow can impact mesoscale atmospheric circulations that lead to major convective storm systems. Furthermore, cloud shadow can also be used to estimate both cloud base and cloud top height which are still a challenge to estimate reliably from space. Thus, it can be important to detect not only clouds but also their shadows from satellite images obtained from, for example, but not limited, high spatial resolution systems.

The locations of cloud shadows in the image depend on the cloud elevations and the incidence angle of the sunlight at the time of day of the measurement. The location of cloud shadows can be determined by the means of geometric calculations if the spatial location of cloud, cloud top and bottom heights, and the sun and satellite positions are known. However, geometry based cloud shadow location can be computationally expensive, and an estimation of a cloud's vertical height is required to determine the cloud shadow location. Thermal channels can be used to estimate the cloud's vertical height, but the determination of a cloud's bottom height can require cloud profiling measurements. Solar reflective bands cannot provide information about the cloud top height, and the cloud bottom information cannot be reliably estimated from passive solar-thermal data either. To determine accurate cloud shadow location, both heights are important, especially for isolated clouds. In any event, many ocean color sensors such as the Sea-viewing Wide Field-of-view Sensor (SeaWiFS) don't have necessary channels to estimate clouds vertical heights.

In comparison to identifying cloud regions using brightness thresholds from ocean color sensor data, it is difficult to identify the cloud shadow regions because their brightness values are very close to those of their neighbors or some other regions. Distinguishing cloud shadows over water bodies based on spectral reflectance shape and amplitude information can be very difficult. Shadows' brightness varies with atmospheric conditions and imaging geometry. Brightness or the spectral shape alone may not be appropriate for cloud shadow detection. However, brightness values from cloud shadows and nearby sunlit regions over water can provide a great deal of information if a small portion of the image (where water and atmosphere can be assumed uniform) is examined at a time. Radiance measured over the water pixels (sunlit pixels) includes three components—radiance due to direct solar light, radiance due to diffuse sky light, and path radiance which accounts for most of the signal measured over water pixels. For the shadow pixels, radiance includes the reflection of the diffuse sky light and the path radiance. Path radiance from cloud shadow pixels to the sensor may be slightly lower than path radiance from sunlit pixels depending on how much of the path radiance atmosphere is shadowed. Water leaving radiance from the shadowed region is slightly lower than the nearby sunlit region since the shadowed region is only illuminated by the diffused sky light. The total top of the atmosphere (TOA) radiance from the shadow region should be slightly lower compared to the adjacent sunlit region. Assuming the optical properties of water and atmosphere are homogeneous around shadow and adjacent sunlit regions, studying small uniform regions one at a time can enable the separation of the cloud shadows from surrounding features.

Existing cloud shadow detection methods typically detect cloud shadows over land, and the geometry-based methods are computationally expensive. Also these methods are not applicable to visible sensors. What are needed are a system and method to identify the cloud shadow locations from airborne and space-borne sensors, the system and method using visible channels since these channels are always present on ocean color sensors.

SUMMARY

The system and method of the present embodiment can detect cloud shadows in images received from ocean color (visible) sensors. Both space-borne and air-borne ocean color sensors can be used as input to the system and method of the present embodiment that automatically distinguish, on a pixel-by-pixel basis, between shadowed pixels and sunlit pixels.

The cloud shadow detection method of the present embodiment can include, but is not limited to including, the steps of automatically calculating an Integrated Value (IV) index for each pixel in the image, automatically creating a plurality of electronic spatial Adaptive Sliding Boxes (ASB), each of the ASBs being selected to be centered on the pixels to be classified as shadowed or sunlit, automatically computing a mean of the IV indices within each of the ASBs, automatically normalizing the IV index of the pixels to be classified as shadowed or sunlit by the mean of the IV indices within the ASB centered on these pixels, and automatically classifying each of the selected pixels as a shadow pixel or a sunlit pixel based on a comparison of the normalized IV index for the selected pixel with a pre-selected threshold.

The system and method of the present embodiment are improvements over the geometry-based method or the reflectance threshold-based technique. Thermal or SWIR channels, which are not always present on ocean color sensors, for example Hyperspectral Imager for Coastal Oceans (HICO), are not required for the computations of the present embodiment. The system and method of the present embodiment are based on visible channels, which always exist on ocean color sensors. Further, the system and method of the present embodiment do not require estimation of cloud vertical height or angular information. The system and method of the present embodiment are based on top of the atmosphere readings such as, for example, top-of-atmosphere radiance measured in raw digital counts, from space borne or airborne sensors, the data from which do not have to be calibrated to detect the cloud shadows.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

The problems set forth above as well as further and other problems are solved by the present teachings. These solutions and other advantages are achieved by the various embodiments of the teachings described herein below.

When solar elevation is low and the sensor is at zenith, a small, compact, thick cloud over water prevents direct solar photons from impinging on the sea surface and shadows a region. Atmospheric compositions, including aerosols, are considered, in the present embodiment, to be the homogeneous in adjacent shadow and sunlit regions. Water-leaving radiance from the shadowed region denoted as $Lw_{sdw}(\lambda)$ (Lw is the standard term for water leaving radiance, the $_{sdw}$ represents shadowed pixels, and the $\lambda$ represents wavelengths) that reaches the sensor, results from only skylight photons since direct photons are removed by the cloud. An adjacent patch of water from a sunlit region has identical inherent optical properties to those of the shadow region. Water-leaving radiance from the neighboring sunlit region denoted as $Lw_{sny}(\lambda)$ ($_{sny}$ represents sunlit pixels) results from illumination of both direct solar and skylight photons. In addition to the water-leaving radiance, radiance recorded at the sensor also includes path radiance due to molecular (or Rayleigh) scattering and particulate (or aerosol) scattering from the field of view of the sensor. Options for the source of path radiance can include (1) only Rayleigh scattering, (2) only aerosol scattering, or (3) a combination of both. These three types of path radiance are denoted by $L_r$, $L_a$ and $L_{ra}$ respectively. Total radiance measured at the sensor's altitude from the sunlit area can be expressed as $$Lt_{sny}(\lambda)=L_r(\lambda)+L_a(\lambda)+L_{ra}(\lambda)+t(\lambda)Lw_{sny}(\lambda) \quad (1)$$

where $t(\lambda)$ represents the diffuse transmittance of the atmosphere for the water-leaving radiance. Total radiance measured at the sensor's altitude over the shadowed region can be expressed similarly, but some differences in path radiance and diffuse transmittance can be expected. Path radiance from the shadow region should be lower since part of the viewing path to the shadowed region is also shadowed, so it should produce less path radiance depending on how much of the atmosphere is shadowed. The apparent path transmittance of water-leaving radiance from the shadow region may be slightly higher since the adjacent areas of the scene are generally brighter, so the apparent transmittance of the viewing path to the shadow could be enhanced by photons reflected from the bright portion of the image and scattered into the field of view of the sensor.

Figure 1:
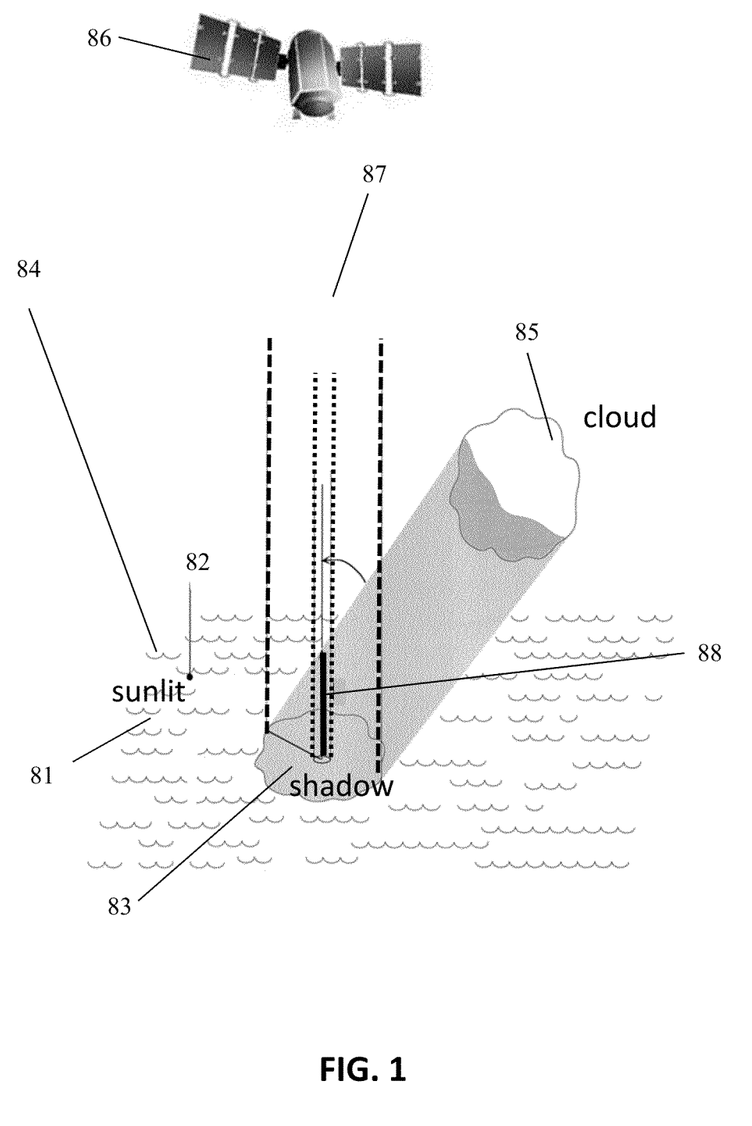
FIG. 1 is a pictorial representation of data measured by a space-borne sensor.

Referring now to FIG. 1, sunlit region 81 is illuminated by both direct solar light 84 and diffuse light 82 (light scattered from air molecules and particles). Shadow region 83 is dimmer than neighboring sunlit region 81 because direct solar light is blocked by cloud 85 and only diffuse light illuminates the region. Space-borne sensor 86 measures total radiance 87 (the water-leaving radiance or the radiance from the water and the atmospheric path radiance). The water leaving radiance from shadow region 83 is lower than in sunlit region 81 because only diffuse light illuminates shadow region 83. Atmospheric path radiance from shadow region 83 is also lower because part of the atmospheric path is shadowed 88. Thus total radiance 87 measured by space-borne sensor 86 from shadow region 83 is lower than neighboring sunlit region 81.

Continuing to refer to FIG. 1, total radiance 87 measured over shadow 83 can be expressed as $$Lt_{sdw}(\lambda)=L_r(\lambda)-\Delta L_r(\lambda)+L_a(\lambda)-\Delta L_a(\lambda)+L_{ra}(\lambda)-\Delta L_{ra}(\lambda)+(t(\lambda)+\Delta t(\lambda))Lw_{sdw}(\lambda) \quad (2)$$

The $\Delta$ term represents the perturbations due to the differences in scene illumination from the sunlit pixels. Water-leaving radiance can be expressed as two parts: one part caused by the backscattering of the diffuse skylight and the other part by backscattering of the direct solar beam. For sunlit regions 81 and shadow regions 83, water-leaving radiance can be expressed as $Lw_{sny}(\lambda)=Lw_{sny}^{sky}(\lambda)+Lw_{sny}^{dir}(\lambda)$ and $Lw_{sdw}(\lambda)=Lw_{sdw}^{sky}(\lambda)$ respectively because $Lw_{sdw}^{dir}(\lambda)=0$, where $Lw_{sny}^{sky}(\lambda)$ ($_{sky}$ represents diffuse skylight) and $Lw_{sny}^{dir}(\lambda)$ ($_{dir}$ represents direct solar beam) represent water-leaving radiance caused by diffuse skylight and direct solar beam in sunlit region 81 respectively, while $Lw_{sdw}^{sky}(\lambda)$ and $Lw_{sdw}^{dir}(\lambda)$ represent water-leaving radiance caused by diffuse skylight and direct solar beam in shadow region 83 respectively. The diffuse irradiances incident on shadow region 83 and sunlit region 81 are unequal because scattering from cloud 85 may increase the diffuse irradiance incident at sunlit region 81. In this case, $Lw_{sny}^{sky}(\lambda)$ can be expressed as $Lw_{sny}^{sky}(\lambda)=Lw_{sdw}^{sky}(\lambda)+\Delta L_{sdw}^{sky}(\lambda)$.

Continuing to still further refer to FIG. 1, based on the above analysis, it can be expected that water-leaving radiance from shadow region 83 ($Lw_{sdw}(\lambda)$) reaching space-borne sensor 86 is lower than the water-leaving radiance from sunlit region 81 ($Lw_{sny}(\lambda)$). Assumptions in the present embodiment include (1) that the optical properties of the water in sunlit 81 and shadow regions 83 are nearly uniform because they are adjacent, (2) that path radiance from shadow region 83 is slightly lower than the path radiance in the sunlit region 81 since part of the atmosphere is also shadowed 88 which must produce less path radiance depending on how much of the atmosphere is shadowed, and (3) that the atmosphere, including aerosol concentration, is uniform across sunlit region 81 and shadow region 83. As a result total radiance 87 measured over shadow region 83 is lower than the total radiance over sunlit region 81.

Continuing to even still further refer to FIG. 1, the shadow detection method of the present embodiment can include, but is not limited to including, two steps. In the first step, the contrast between shadow region 83 and neighboring sunlit region 81 is magnified. In the second step, because radiance changes with imaging geometry and atmospheric conditions, a small portion of an image received by space-borne sensor 86 is examined at a time where water and atmosphere properties can be assumed homogeneous and the image is normalized adaptively. Adaptive normalization can make it possible to use a constant threshold to separate shadowed regions 83 from sunlit regions 81 for the region of interest (ROI) which can be extended to the entire image. The constant threshold can be sensor specific.

With respect to step one, small differences in the spectral amplitudes from the acquired sensor image, particularly in the blue-green regions of the spectra can be magnified by integrating the spectra. The magnification can be accomplished by computing an IV index for each pixel defined as $$IV = \int_{\lambda_1}^{\lambda_2} L_t(\lambda)d\lambda \qquad (3)$$

The $\lambda_1$ and $\lambda_2$ can range from 400 nm to 700 nm. However, for HICO sensor wavelength range from 400 nm to 600 nm is sufficient. Before computing the IV, clouds are removed by standard techniques. For example, but not limited to the following example, a band ratio between HICO band HB35 (548 nm) and HB70 (748 nm) can be used to filter cloud pixels from the image.

Figure 2:
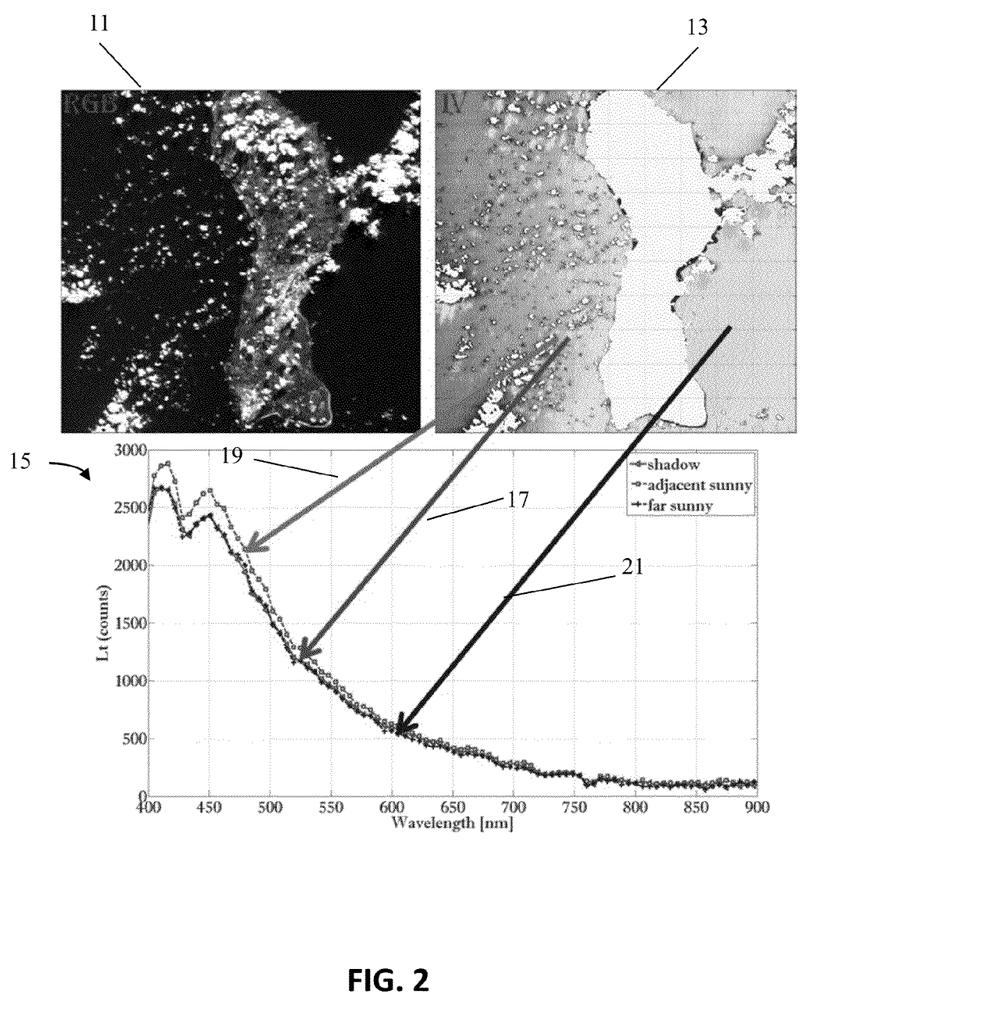
FIG. 2 is series of related charts including a true color image showing clouds, cloud shadows, and cloud-free areas over land and water, a corresponding IV image, and a top of the atmosphere radiance spectra graph based on the true color image and referencing the IV image.

Referring now to FIG. 2, true color HICO image 11 was taken on Nov. 11, 2009, over Guam. Corresponding IV index image 13 shows clouds and land in white, and the shadow regions are shown in a slightly "cooler" color compared to the surrounding sunlit regions, and top of the atmosphere radiance spectra 15 from shadow spectrum 17 (red), adjacent sunlit spectrum 19 (green), and far sunlit spectrum 21 (blue) pixels. Red, green, and blue arrows show the location of the radiance spectra of shadow spectrum 17, adjacent sunlit spectrum 19, and far sunlit spectrum 21 pixels respectively on IV index image 13. Red shadow spectrum 17 is very similar to the blue far sunlit spectrum 21. Thus, the spectral profile alone is not adequate to separate the shadow regions for an entire image. Shadow spectrum 17 represents $Lt_{sdw}(\lambda)$ and adjacent sunlit spectrum 19 represents adjacent $Lt_{sny}(\lambda)$. It can be clearly seen that the green adjacent sunlit spectrum 19 has higher radiance than the red shadow spectrum 17 due to differences in illuminations. Band integration can be used to magnify the contrast between the two regions. HICO, for example, has thirty-five bands in the 400 nm-600 nm range. Integrating those bands adds up the difference between the red shadow spectrum 17 and green adjacent sunlit spectrum 19. Thus magnifies the contrast between them.

Figure 3:
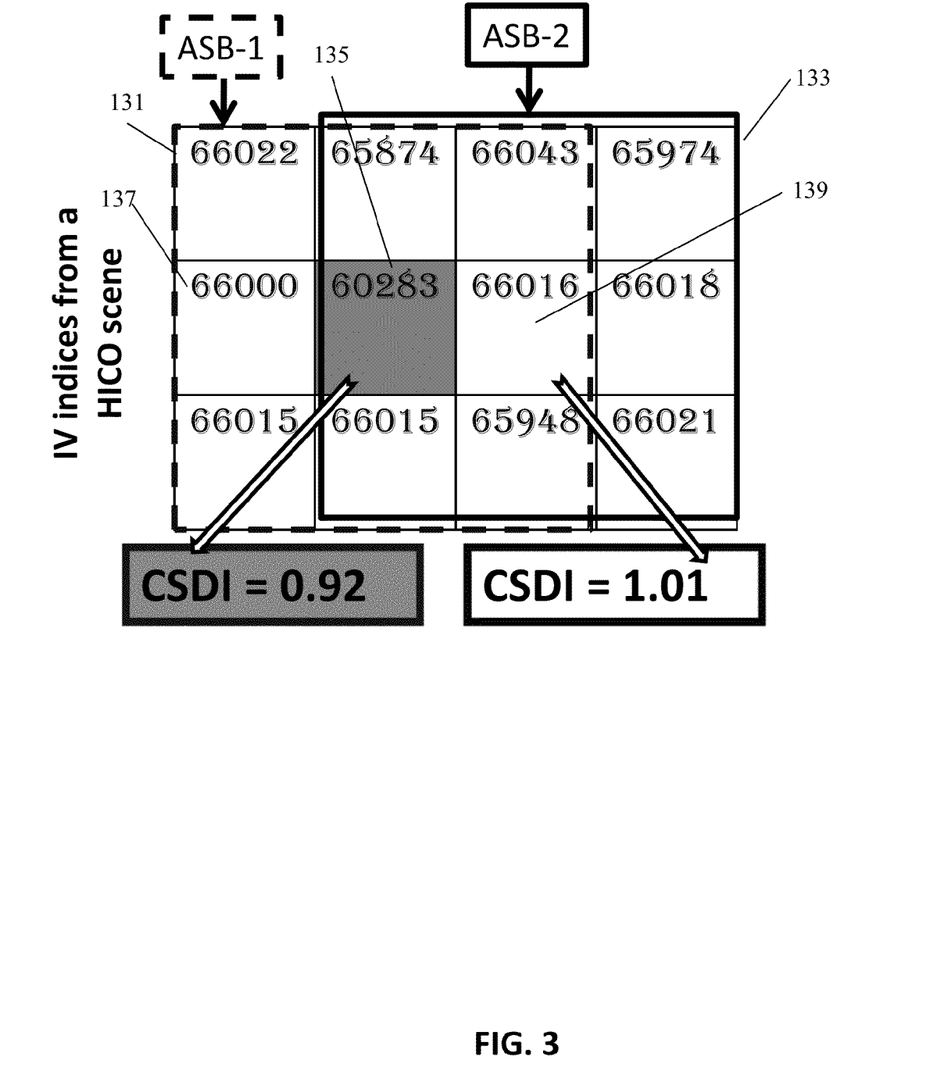
FIG. 3 is a pictorial representation of a cloud shadow detection index computation.

Continuing to refer to FIG. 2, with respect to step two, IV index image 13 may allow visual separation of the two regions to an observer, but alone IV index image 13 is not adequate to separate the two regions using a threshold. This is because the IV indices from shadow spectrum 17 can be very close to or even higher than IV indices of some other far sunlit spectrum 21. To overcome this issue, a small portion of the image can be examined at a time where it can be assumed that atmospheric and marine optical properties are homogeneous. A spatial Adaptive Sliding Box (ASB) can be selected where water and atmosphere are nearly uniform. The mean of the IV indices in the ASB is taken and the central pixel of the ASB is divided by the mean. This operation is referred to herein providing a Cloud Shadow Detection Index (CSDI)) and can be quantified as:

$$CSDI = \frac{IV_c}{\langle IV_{ASB} \rangle} \qquad (4)$$

where $IV_c$ represents the IV index of the pixel that needs to be classified as a shadow or sunlit pixel. The ASB should be selected to be centered on this pixel. The $\langle IV_{ASB} \rangle$ represents the mean of IV indices within the selected ASB of this pixel. This process can be repeated for all pixels that need to be classified as shadow or sunlit Referring now to FIG. 3, ASB-1 131 includes shadowed central pixel 135. Surrounding pixels, such as left center pixel 137, are sunlit. The calculated CSDI value for this shadowed pixel is 0.92 while the CSDI value for sunlit pixel 139 of ASB-2 133 is 1.01. Shadowed pixels have CSDI values <1 while all other pixels have CSDI values around or above 1. In the present example, the CSDI threshold for shadow pixels separation is <0.96.

Figure 4:
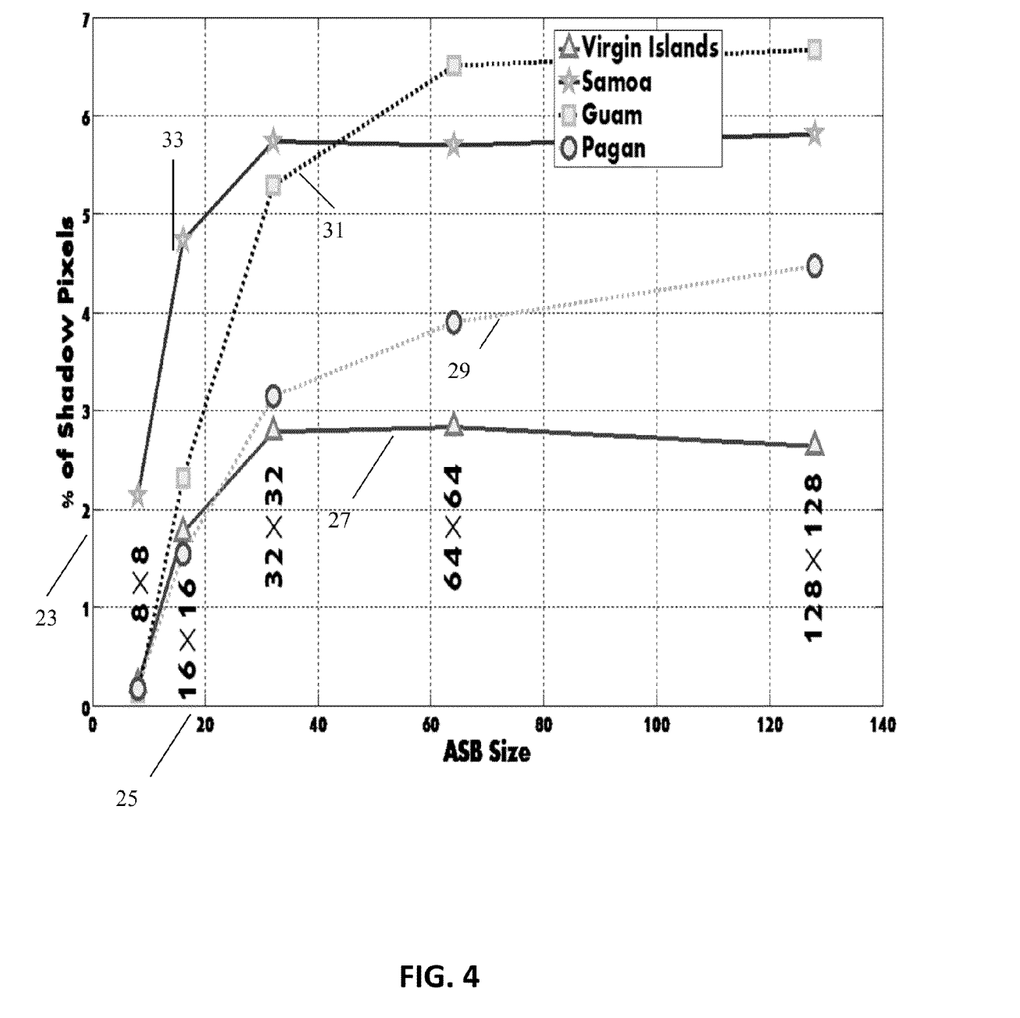
FIG. 4 is a graph of an analysis of ASB size with respect to the shadowed pixels based on data from the HICO images in FIGS. 5 and 6.
Figure 5:
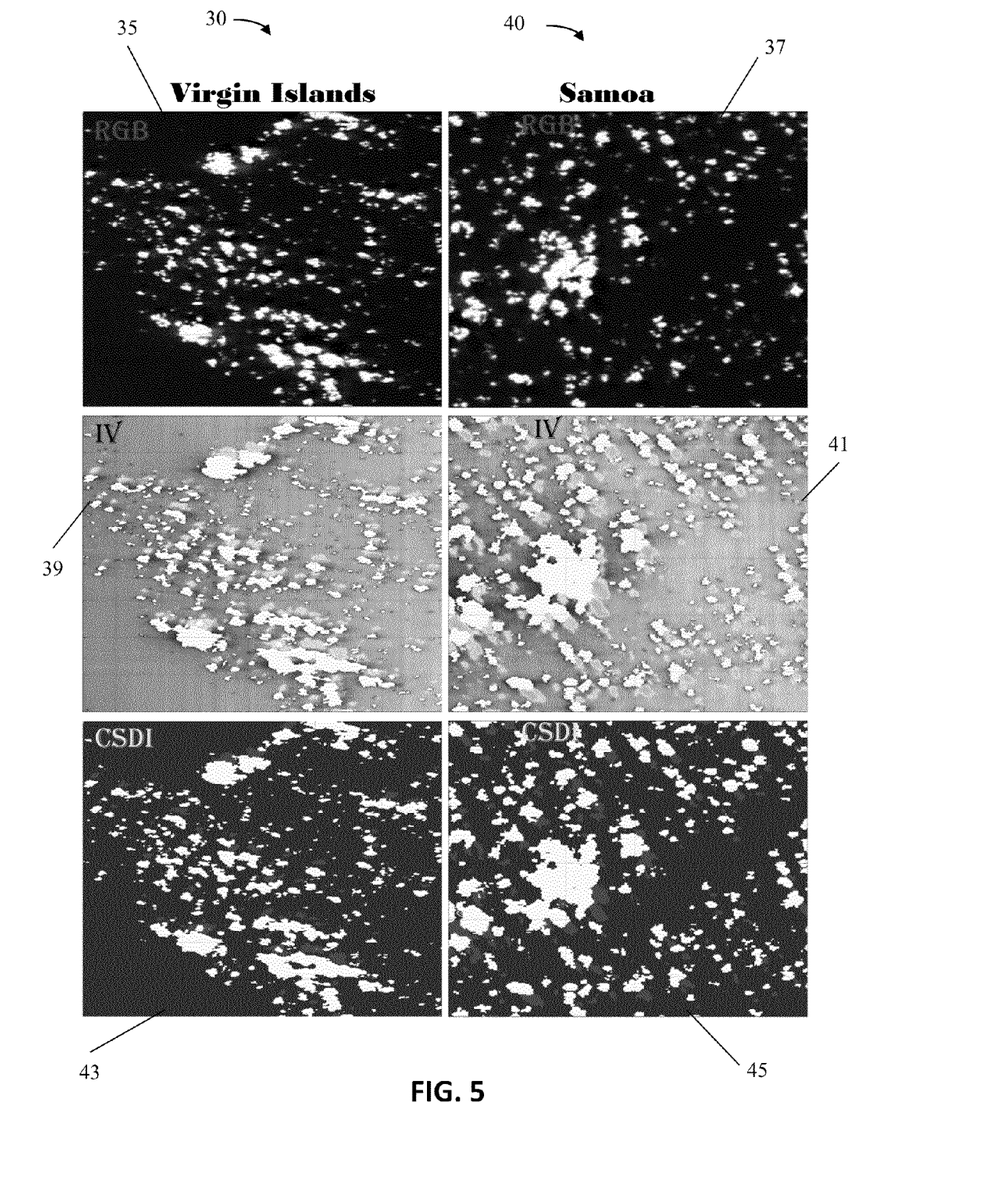
FIG. 5 is a series of related charts including HICO images from two locations, corresponding IV index images, and corresponding cloud shadow images created according to the present embodiment.
Figure 6:
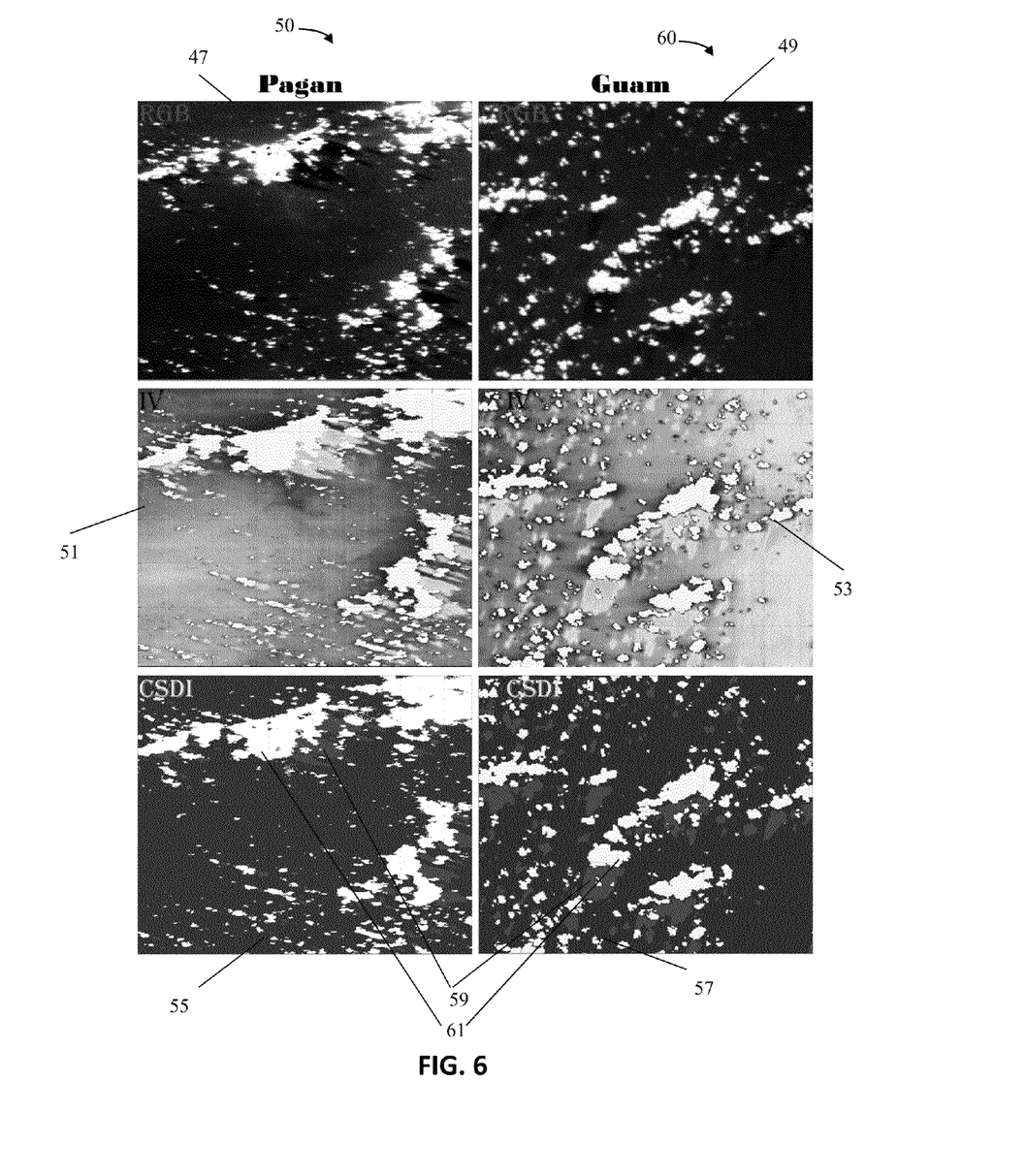
FIG. 6 is a series of related charts including the same elements as FIG. 5, with cloud shadows that are relatively larger than the cloud shadows in FIG. 5.

Referring now to FIG. 4, an analysis of the ASB size was performed on the images shown in FIGS. 5 and 6. Horizontal axis 25 represents the ASB sizes (8 represents 8×8, 16 represents 16×16, 32 represents 32×32, 64 represents 64×64, and 128 represents 128×128 pixels), and vertical axis 23 represents the percent of shadow pixels detected with each ASB. These data were collected around Virgin Islands 27 on Dec. 20, 2009, around Samoa 33 on Oct. 2, 2010, around Guam 31 on Nov. 11, 2009, and around Northern Mariana Pagan 29 on Sep. 26, 2010. Virgin Islands 27 and Samoa 33 have relatively smaller shadows while Guam 31 and Pagan 29 has relatively larger shadows. ASB sizes 8×8 or 16×16 do not detect most of the shadow pixels. ASB size 32×32 can detect the smaller shadows of the Virgin Islands 27 and Samoa 33, while large ASB sizes detect the larger shadows of Guam 31 and Pagan 29. A particular ASB is chosen for detection purposes, and for computation time purposes. Large ASBs can require higher computational resources than smaller ASBs. An ASB is also selected so that it contains shadow and sunlit pixels or only sunlit pixels. If the ASB only contains sunlit pixels and the pixel under examination is also sunlit, the CSDI value for this pixel is around one since the mean of the ASB and IV index of this pixel would be about the same. On the other hand, if the ASB contains both shadow and sunlit pixels and the pixel under examination is sunlit, the CSDI value is greater than one because the mean of the ASB will be slightly lower than the IV index of the pixel under examination. On the other hand if the pixel under examination happens to be shadowed, the CSDI value is less than one since the IV index of this shadow pixel is smaller than the mean of the ASB. The ASB can be automatically selected so that it is bigger than the shadowed region under examination using cloud size information that is detectable using simple brightness thresholds. The CSDI value is computed using top-of-atmosphere radiance measured in raw digital counts and thus no conversion of the data to radiance units is required.

Examples of shadow detection with the method of the present embodiment with a threshold of 0.96 are shown in FIGS. 5 and 6. A 128×128 ASB was selected for these images.

Referring now to FIG. 5, Virgin Islands data 30 acquired over the Virgin Islands on Dec. 20, 2009 (image size: 270× 400 pixels). Virgin Islands data 30 includes true color image 35, the corresponding Virgin Islands IV image 39, and Virgin Islands CSDI image 43 computed by using the system and method of the present embodiment. Samoa data 40 acquired over Samoa on Oct. 2, 2010 (image size: 260×260 pixels), includes Samoa true color image 37, Samoa IV image 41, and Samoa CSDI image 45 computed by using the system and method of the present embodiment.

Referring now to FIG. 6, Pagan data 50 acquired over Pagan on Sep. 26, 2010 (image size: 380×635 pixels), including Pagan true color image 47, Pagan IV image 51, and Pagan CSDI image 55 computed by using the system and method of the present embodiment are shown. Guam data 60 shows a HICO image acquired over Guam Nov. 11, 2009 (image size: 275×275 pixels), including Guam true color image 49, Guam IV image 53, and Guam CSDI image 57 computed by using the system and method of the present embodiment. Clouds are shown in white on both CSDI and IV images while shadows are shown in red on Pagan CSDI image 55 and Guam CDSI image 57 and in a slightly cooler color compare to the neighboring sunny region on Pagan IV image 51 and Guam IV image 53. Sunlit regions are shown in blue on Pagan CSDI image 55 and Guam CDSI image 57, and in slightly warmer color compare to the adjacent shadow regions on Pagan IV image 51 and Guam IV image 53. Cloud shadows 59 are clearly seen in red structures adjacent to the white clouds on CSDI images and also the shape of the cloud shadow especially for the isolated cloud closely follows that of clouds 61 as expected.

Figure 7:
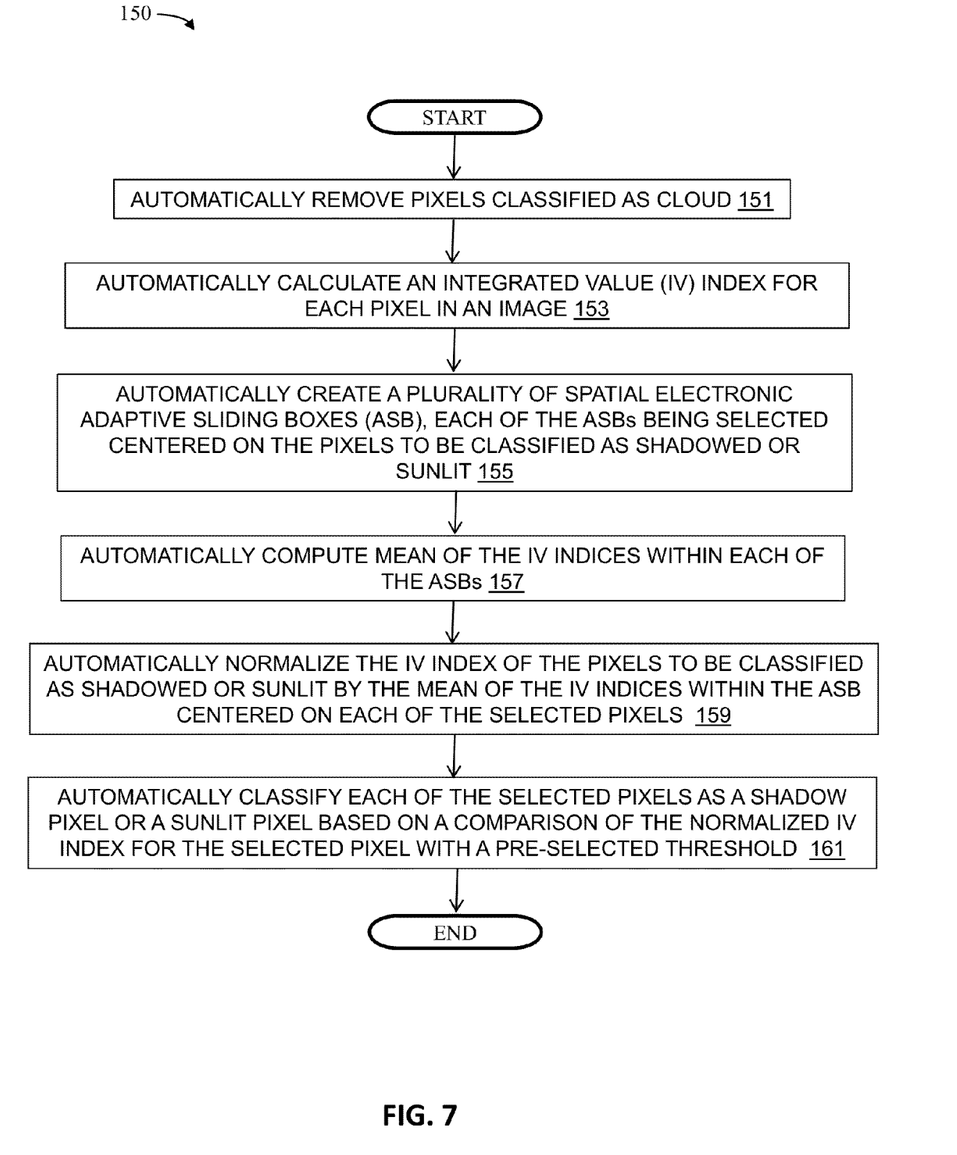
FIG. 7 is a flowchart of the method of the present embodiment.

Referring now to FIG. 7, method 150 for detecting cloud shadows over water from ocean color imagery from an image received from a remote sensor can include, but is not limited to including, the steps of automatically removing 151 pixels classified as cloud, automatically calculating 153 an Integrated Value (IV) index for each pixel in the image, automatically creating 155 a plurality of electronic spatial Adaptive Sliding Boxes (ASB), the ASBs are being selected centered on the pixels to be classified as shadowed or sunlit, automatically computing 157 mean of the IV indices within each of the ASBs, automatically normalizing 159 the IV index of the pixels under examination (to be classified as shadowed or sunlit) by the mean of the IV indices within the ASBs centered on each pixels, and automatically classifying 161 the pixels as a shadow pixel or a sunlit pixel based on a comparison of the normalized IV index with a pre-selected threshold. The step of calculating an IV index can include, but is not limited to including, the step of $$\text{computing } IV = \int_{\lambda_1}^{\lambda_2} L_t(\lambda)\, d\lambda.$$

The method can optionally include the step of determining the size of the ASB based on cloud size and a pre-selected desired computation time. The step of normalizing the IV index can include, but is not limited to including, the step of $$\text{computing } CSDI = \frac{IV_c}{\langle IV_{ASB} \rangle}.$$

The pre-selected threshold can be ~0.96. The method can further optionally include the step of selecting the pre-selected threshold based on the remote sensor.

Figure 8:
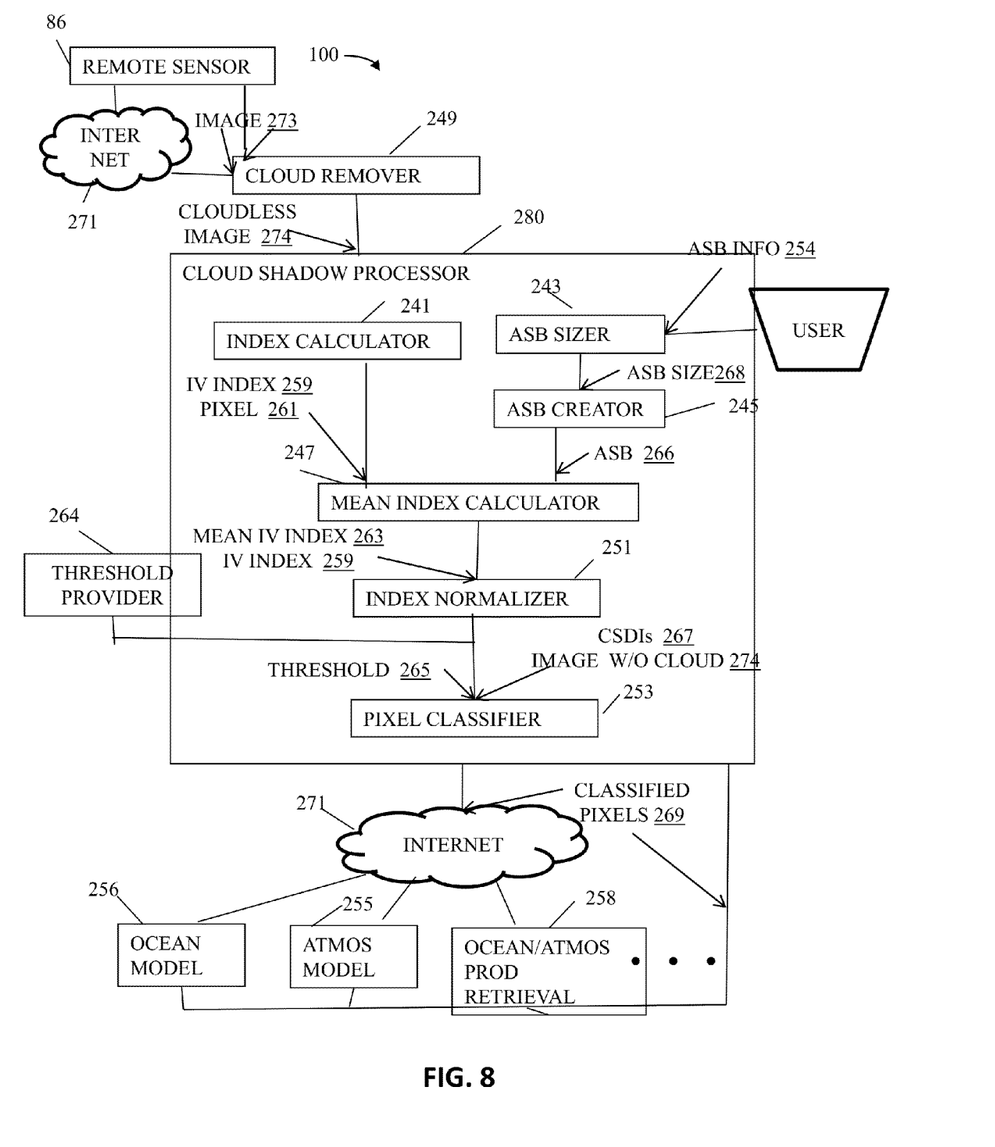
FIG. 8 is a schematic block diagram of the system of the present embodiment.

Referring now to FIG. 8, system 100 for detecting cloud shadows over water from ocean color imagery can include, but is not limited to including, cloud remover 249 automatically removing each pixel classified as a cloud pixel from image 273 to produce cloudless image 274, index calculator 241 automatically calculating Integrated Value (IV) index 259 for each pixel 261 in cloudless image 274 received from remote sensor 86 directly or, for example, through interne 271. System 100 can also include ASB sizer 243 determining an appropriate ASB size 268 based on ASB info 254 such as, for example, but not limited to, required computation time, cloud size in the image, and other factors. System 100 can also include ASB creator 245 automatically creating electronic ASBs 266, each ASB 266 being centered on a selected pixel 261 to be classified as shadowed or sunlit. System 100 can also include mean index calculator 247 automatically computing mean IV index 263 of the IV indices 259 within each ASB 266. System 100 can still further include index normalizer 251 automatically normalizing IV index 259 for each selected pixels 261 by mean IV index 263 within ASB 266 centered on each selected pixel 261. System 100 can also include pixel classifier 253 automatically classifying each selected pixel 261 as a shadow pixel or a sunlit pixel based on a comparison of the normalized IV index (CSDI) 267 for selected pixel 261 with pre-selected threshold 265, optionally provided by threshold provider 264. Index calculator 241 can compute IV index according to the following formula:

$$IV = \int_{\lambda_1}^{\lambda_2} L_t(\lambda)\, d\lambda.$$

Index normalizer 251 can compute CSDI 267 according to the following formulas:

$$CSDI = \frac{IV_c}{\langle IV_{ASB} \rangle}.$$

Threshold 265 can be approximately 0.96 for HICO sensor but it may vary for other sensors. Threshold provider 264 can select threshold 265 based on remote sensors 86. ASB 266 can be a 128×128 pixel box. Cloud shadow processor 280 can provide, either directly or through an interface such as, for example, internet 271, classified pixels 269 to a variety of computational models and other data sinks, including, but not limited to, ocean model 256, atmospheric model 255, and ocean/atmospheric product retrieval 258.

The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in MAT-LAB® and C. The system operates on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on a different computer. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIG. 7, method 150 can be, in whole or in part, implemented electronically. Signals representing actions taken by elements of system 100 (FIG. 8) and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer-based method for cloud shadow detection from an image received from a remote sensor comprising the steps of:
    automatically calculating an Integrated Value (IV) index for each pixel in the image;
    automatically creating a plurality of electronic spatial Adaptive Sliding Boxes (ASB), each of the ASBs being selected centered on the pixels to be classified as shadowed or sunlit;
    automatically computing a mean of the IV indices within each of the ASBs;
    automatically removing each of the pixels classified as cloud;
    automatically normalizing the IV index for each of the selected pixels by the mean of the IV indices within the ASB centered on each of the selected pixels; and
    automatically classifying each of the selected pixels as a shadow pixel or a sunlit pixel based on a comparison of the normalized IV index for the selected pixel with a pre-selected threshold.

2. The method as in claim 1 wherein said step of calculating an IV index comprises the step of:

$$\text{computing } IV = \int_{\lambda_1}^{\lambda_2} L_t(\lambda) d\lambda.$$

3. The method as in claim 1 further comprising the step of:
    determining the size of the ASB based on cloud size and a pre-selected desired computation time.

4. The method as in claim 1 wherein said step of normalizing the IV index comprises the step of:

$$\text{computing } CSDI = \frac{IV_c}{\langle IV_{ASB} \rangle}.$$

5. The method as in claim 1 wherein the pre-selected threshold is 0.96.

6. The method as in claim 1 further comprising the step of:
    selecting the pre-selected threshold based on the remote sensor.

7. The method as in claim 1 wherein the ASB comprises a 128×128 pixel box.

8. A computer-based system for cloud shadow detection from an image received from a remote sensor comprising:
    index calculator automatically calculating an Integrated Value (IV) index for each pixel in the image;
    ASB creator automatically creating a plurality of electronic spatial ASB, each of the ASBs being selected centered on the pixels to be classified as shadowed or sunlit;
    mean index calculator automatically computing a mean of the IV indices within each of the ASBs;
    cloud remover automatically removing each of the pixels classified as cloud;
    index normalizer automatically normalizing the IV index for each of the selected pixels by the mean of the IV indices within the ASB centered on each of the selected pixels; and
    pixel classifier automatically classifying each of the selected pixels as a shadow pixel or a sunlit pixel based on a comparison of the normalized IV index for the selected pixel with a pre-selected threshold.

9. The system as in claim 8 wherein said index calculator calculates an IV index according to the formula $$IV = \int_{\lambda_1}^{\lambda_2} L_t(\lambda) d\lambda.$$

10. The system as in claim 8 further comprising:
    ASB sizer determining the size of the ASB based on cloud size and a pre-selected desired computation time.

11. The system as in claim 8 wherein said index normalizer normalizing calculates the CSDI according to the formula:

$$CSDI = \frac{IV_c}{\langle IV_{ASB} \rangle}.$$

12. The system as in claim 8 wherein the pre-selected threshold is 0.96.

13. The system as in claim 8 further comprising:
threshold provider selecting the pre-selected threshold based on the remote sensor.

14. The system as in claim 8 wherein the ASB comprises a 128×128 pixel box.

15. A non-transitory computer-readable medium storing a computer program for cloud shadow detection from an image received from a remote sensor, said computer program comprising the steps of:
automatically calculating an Integrated Value (IV) index for each pixel in the image;
automatically creating a plurality of electronic spatial Adaptive Sliding Boxes (ASB), each of the ASBs being centered on a selected one of the pixels to be classified as shadowed or sunlit;
automatically computing a mean of the IV indices within each of the ASBs;
automatically removing each of the pixels classified as cloud;
automatically normalizing the IV index for each of the selected pixels by the mean of the IV indices within the ASB centered on each of the selected pixels; and
automatically classifying each of the selected pixels as a shadow pixel or a sunlit pixel based on a comparison of the normalized IV index for the selected pixel with a pre-selected threshold.

16. The computer-readable medium as in claim 15 wherein said step of calculating an IV index comprises the step of:

$$\text{computing } IV = \int_{\lambda_1}^{\lambda_2} L_t(\lambda)\,d\lambda.$$

17. The computer-readable medium as in claim 15 further comprising the step of:
determining the size of the ASB based on cloud size and a pre-selected desired computation time.

18. The computer-readable medium as in claim 15 wherein said step of normalizing the IV index comprises the step of:

$$\text{computing } CSDI = \frac{IV_c}{\langle IV_{ASB} \rangle}.$$

19. The computer-readable medium as in claim 15 wherein the pre-selected threshold is 0.96.

20. The computer-readable medium as in claim 15 further comprising the step of:
selecting the pre-selected threshold based on the remote sensor.

21. A computer-based method for cloud shadow detection from an image received from a remote sensor comprising the steps of:
automatically calculating an Integrated Value (IV) index for each pixel in the image;
automatically creating a plurality of electronic spatial Adaptive Sliding Boxes (ASB), each of the ASBs being selected centered on a pixel;
automatically computing a normalizing factor of the IV indices within each of the ASBs;
automatically normalizing the IV index for each of the selected pixels by the normalizing factor of the IV indices within the ASB centered on each of the selected pixels; and
automatically classifying each of the selected pixels based on a comparison of the normalized IV index for the selected pixel with a pre-selected threshold.

\* \* \* \* \*